(No Model.)
E. KIPPER.
MANUFACTURE OF SOLID RINGS FROM PYROXYLINE COMPOUNDS AND OTHER PLASTIC MATERIALS.
No. 335,935. Patented Feb. 9, 1886.
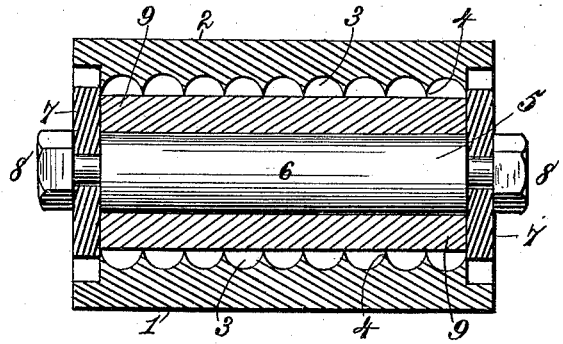
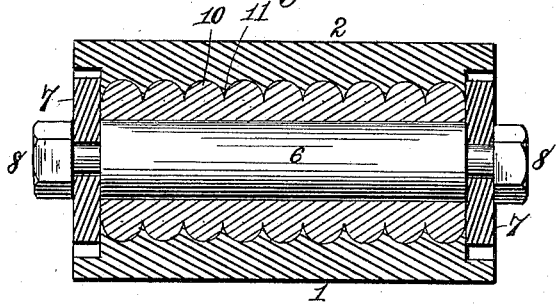
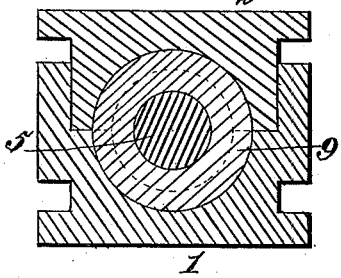
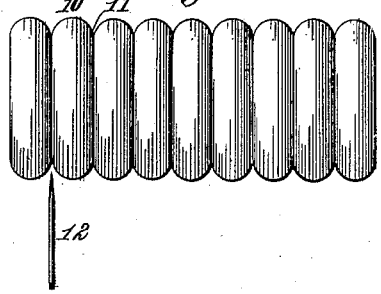
Witnesses
Robert Everett.
Dennis Sumby.
Inventor
Emil Kipper.
By James L. Norris.
Atty.

UNITED STATES PATENT OFFICE.

EMIL KIPPER, OF ADAMS, MASSACHUSETTS.

MANUFACTURE OF SOLID RINGS FROM PYROXYLINE COMPOUNDS AND OTHER PLASTIC MATERIALS.

SPECIFICATION forming part of Letters Patent No. 335,935, dated February 9, 1886.

Application filed October 5, 1885. Serial No. 179,033. (No specimens.)

*To all whom it may concern:*

Be it known that I, EMIL KIPPER, a subject of the Emperor of Germany, residing at Adams, in the county of Berkshire and State of Massachusetts, have invented new and useful Improvements in the Manufacture of Solid Rings from Pyroxyline Compounds and other Plastic Materials, of which the following is a specification.

This invention relates to the manufacture of solid rings from pyroxyline compounds or other plastic materials, and has for its object to provide an improved process or method of manufacturing the rings, whereby stratified products may be obtained which resemble natural ivory, although the process or method may be employed in the production of solid rings from a plastic material of a homogeneous nature.

The invention consists in drawing or otherwise placing a tube, sheet, or other body of a pyroxyline compound or other plastic material upon or about a mandrel of suitable construction, then producing a series of annular ribs or projections and lines of depression on the outside surface of the material in a die or mold under pressure, then removing such ribbed tube from the die or mold and severing the same into detached rings along the lines of depression between the respective ribs or projections, through the medium of a cutting-tool or otherwise, so that each annulus or ring is furnished with a curved outer periphery and a squared or angular interior surface, and finally cutting or otherwise turning off or removing such squared or angular portion to provide completed rings which are circular in cross-section. I have discovered that, according to this process or method, if the pyroxyline compound is prepared by stratifying it I can obtain stratified products bearing linear shades closely resembling natural ivory; but I do not wish to be understood as confining my invention thereto, as I can obtain satisfactory products by operating on pyroxyline compounds or other plastic materials prepared as a homogeneous mass.

The accompanying drawings illustrate an apparatus for carrying my invention into effect, in which Figure 1 is a longitudinal sectional view of a die or mold, showing the position of the parts prior to the application of pressure; Fig. 2, a similar view showing the position of the parts after pressure has been applied to produce the annular concentric ribs or projections on the outer surface of the pyroxyline or other plastic material; Fig. 3, a transverse sectional view of the apparatus; Fig. 4, an elevation of the ribbed tube removed from the die or mold, showing a cutter or knife in position to sever the tube into rings; Fig. 5, a cross-sectional view of one of the rings after being severed from the tube, and prior to its final completion; and Fig. 6, a similar view showing the completed ring.

In order to enable those skilled in the art to practice my invention, I will now proceed to describe the same in detail by reference to the drawings, where—

The numeral 1 indicates the bottom or base of the die or mold, and 2 the top or cover, each part being provided on its interior surface with a series of semicircular recesses, 3, joining each other by annular sharp or V-shaped edges 4, all in such manner that when the two parts of the die are brought together the recesses and sharp edges will coincide with each other and form a series of separated annular channels—square or angular for one portion and semicircular for the other portion. The mandrel 5 is constructed or provided with a smooth or plane faced cylindrical surface, 6, and at its ends is supported in orifices in end washers or heads, 7, which are confined in place by nuts 8, or other fastening devices, engaging with the projecting ends of the mandrel. The pyroxyline compound or other plastic material, 9, to be made into solid rings is placed around or about the mandrel in any well-known manner. It may be a complete tube drawn upon the mandrel; or it may be a rectilinear sheet, made to encompass the mandrel and its meeting edges welded together by pressure in the two-part die; or it may be flowed about the mandrel, or in the form of two separate sheets caused to encompass the mandrel and welded at the meeting edges during the pressing operation; but in order to produce stratified products I use pyroxyline compounds in which the sheets are made up by stratification, so as to produce linear shades in the surface of the article to resemble natural ivory. After the material is placed upon the mandrel the two-part die is subjected to heat and pressure to convert the mandrel into a seamless tube and produce on the surface thereof a series of connected annular curved ribs or projections, 10, and a series of depressed lines, 11, all concentric with each other, while the interior surface of the tube will remain perfectly flat or square, by reason of the plane or smooth surface to the cylindrical mandrel. The die is then separated and the ribbed tube removed therefrom and placed in a lathe, so that by presenting a cutter or knife, 12, Fig. 4, to the depressed lines 11 and revolving the tube the latter will be subdivided into detached rings, each having a semicircular periphery and a squared interior, as shown in Fig. 5. The squared inner surface of each annulus thus produced is then turned off by a cutter, or otherwise removed, thereby finishing the article and producing solid rings, which are round or circular in cross-section.

If a complete tube formed by a stuffing-machine be employed, I produce solid rings having no weld whatever, which makes an article possessing greater strength than if a weld is present, and if the zylonite or other pyroxyline compound be prepared by stratification I obtain stratified products closely resembling ivory, &c.

The ribbed tube may or may not be left on the mandrel while severing it on the lines of depression, but if left on the mandrel the latter may serve as a medium for supporting the tube in a lathe.

I do not confine myself to producing rings in which the peripheries are true circles, as rings of polygonal, hexagonal, or other angular outline may be obtained by correspondingly constructing the interiors of the parts comprising the die.

It will be observed that the die may sever each ring entire during the operation of pressing, thereby avoiding the necessity of subsequent cutting operations.

Having thus described my invention, what I claim is—

1. The process or method herein described of making solid rings from pyroxyline compounds or other plastic materials, which consists in first producing a series of connected annular curved ribs or projections alternating with depressed lines on the outer surface of a body of the material, and severing such material on the depressed lines to form rings having squared or angular interior and curved exterior surfaces, substantially as described.

2. The process or method herein described of making solid rings from pyroxyline compounds or other plastic materials, which consists in first producing a series of connected annular curved ribs or projections alternating with depressed lines on the outer surface of a body of the material, severing such material on the depressed lines to form rings having squared or angular interior and curved exterior surfaces, and finally removing such squared or angular interior surfaces to form complete rings circular in cross-section, substantially as described.

3. The process or method herein described of making solid rings from pyroxyline compounds or other plastic materials, which consists in placing a tube, sheet, or other body of the material upon or about a smooth-faced mandrel, then forming on such material in a die or mold a series of concentric annular ribs or projections connected by lines of depression, severing such material on the lines of depression into detached rings, and finally turning off the squared or angular interior surfaces to form rings circular in cross-section, substantially as described.

4. In an apparatus for the manufacture of articles from pyroxyline compounds or other plastic material, a two-part mold or die, a smooth-faced mandrel, against the surface of which the material is placed, and a detachable end washer or washers engaging the mandrel, substantially as described.

In testimony whereof I have affix my signature in presence of two witnesses.

EMIL KIPPER.

Witnesses:
H. H. SCHÜRMANN,
W. N. BIXBY.